(12) United States Patent
Liu et al.

(10) Patent No.: US 8,478,912 B2
(45) Date of Patent: Jul. 2, 2013

(54) MAGNETIC CONNECTOR FOR DATA AND POWER TRANSFER

(75) Inventors: Ping Liu, San Jose, CA (US); Livius Chebeleu, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/170,942

(22) Filed: Jun. 28, 2011

(65) Prior Publication Data
US 2012/0200173 A1  Aug. 9, 2012

Related U.S. Application Data

(60) Provisional application No. 61/440,375, filed on Feb. 7, 2011.

(51) Int. Cl.
*G06F 13/12* (2006.01)
*G06F 13/38* (2006.01)
*G06F 13/00* (2006.01)

(52) U.S. Cl.
USPC ............................................ 710/62; 710/316

(58) Field of Classification Search
USPC ................................................... 710/62, 316
See application file for complete search history.

(56) References Cited

U.S. PATENT DOCUMENTS

| | | | |
|---|---|---|---|
| 6,695,620 B1 * | 2/2004 | Huang | 439/11 |
| 2004/0160993 A1 * | 8/2004 | Ganton et al. | 370/537 |
| 2004/0257431 A1 * | 12/2004 | Girish et al. | 348/14.01 |
| 2006/0165110 A1 * | 7/2006 | Magendanz et al. | 370/419 |
| 2008/0167087 A1 * | 7/2008 | Tang et al. | 455/569.1 |
| 2008/0270647 A1 * | 10/2008 | Shih et al. | 710/63 |
| 2010/0115147 A1 * | 5/2010 | Kim | 710/14 |

* cited by examiner

Primary Examiner — Farley Abad

(57) ABSTRACT

A mobile computing device is disclosed. The mobile computing device comprises a connector with a plurality of contacts and a processing resource. The connector is structured mate with different types of connectors. The mobile computing device also includes a data switching component that is configured to detect a type of connector that is mated to the connector. Based on the detected mated connector, the data switching component selects a signal path from the connector to the processing resource along either a first data path or a second data path.

15 Claims, 7 Drawing Sheets

MAGNETIC CONNECTOR FOR DATA AND POWER TRANSFER

RELATED APPLICATIONS

This application claims the benefit of priority under 35 U.S.C. 119(e) to Provisional Application Ser. No. 61/440, 375, filed Feb. 7, 2011, titled "Magnetic Connector for Data and Power Transfer", which is incorporated herein by reference in its entirety.

BACKGROUND OF THE INVENTION

Portable electronic devices have become so integrated into society that they are heavily relied on by users for performing a variety of different tasks. For example, cellular phones and other mobile devices can be used to view videos and television shows, browse the Internet, take photographs, play games, send and receive emails, and perform numerous other tasks.

In designing small form factor devices, such as a smart phone, the size and layout of different internal components must be strongly considered. It is often beneficial for a device to include as many features as possible, and have the proper components to carry out those functions. Thus, there is a challenge in designing small form factor devices to include various features with the device and have their components all fit within the housing of the device.

With the size of mobile devices being a physical constraint, different means and mechanisms must be utilized to implement a variety of features without having to increase the size of the form factor of the mobile device.

BRIEF DESCRIPTION OF THE DRAWINGS

The disclosure herein is illustrated by way of example, and not by way of limitation, in the figures of the accompanying drawings and in which like reference numerals refer to similar elements, and in which.

DETAILED DESCRIPTION

Figure 1:
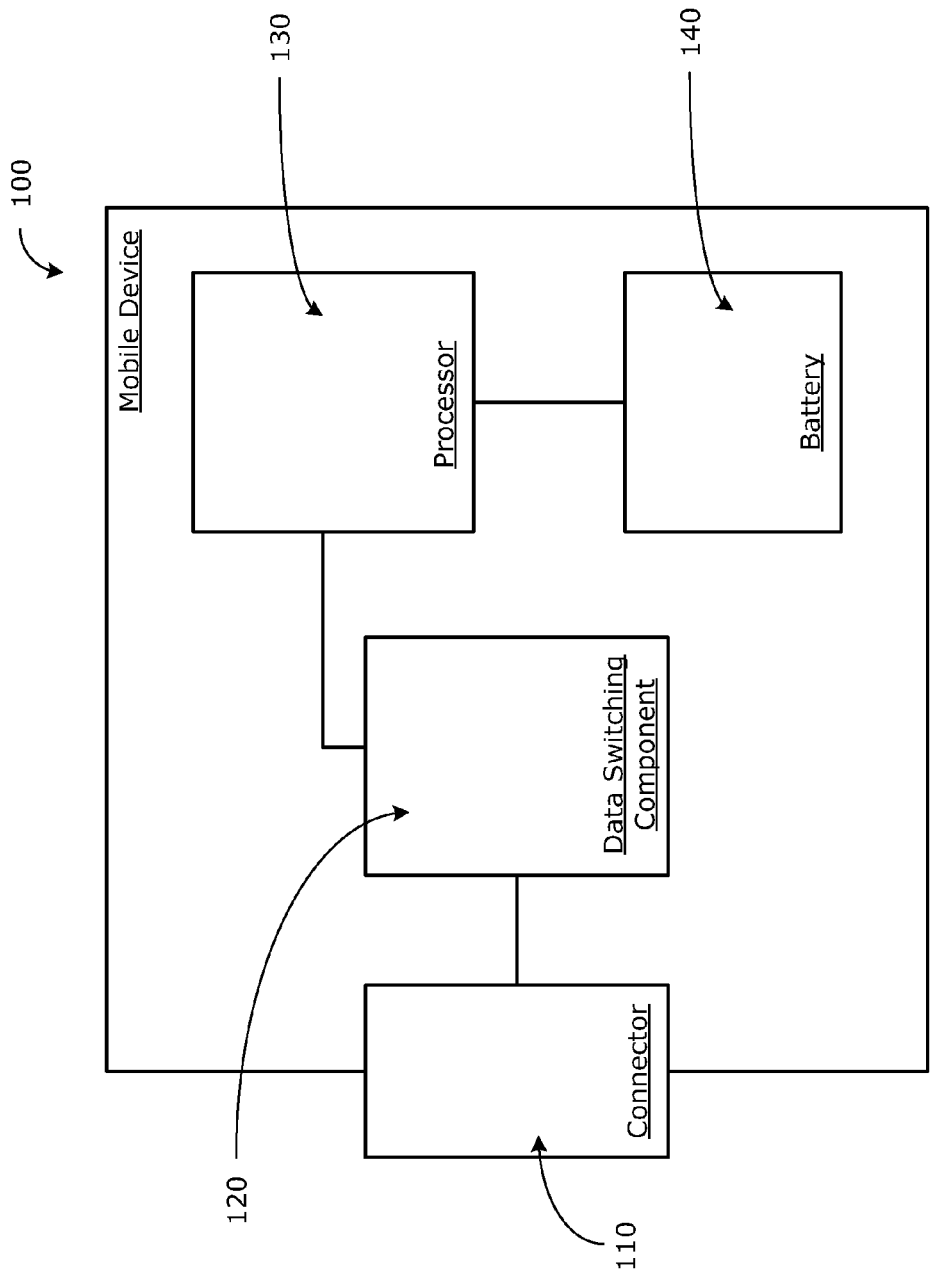
FIG. 1 is a simplified block diagram of a mobile device under an embodiment.

Embodiments described herein include a mobile computing device having a connector that is provided with structure and resources for providing versatility to the connector. Moreover, the connector includes features to minimize the impact of the connector and associated connected devices on the overall form factor of the mobile computing device.

In an embodiment, a mobile computing device comprises a connector with a plurality of contacts. The connector is structured to mate with a variety of different connectors. The mobile computing device also comprises a processing resource and a data switching component. The data switching component is configured to detect the type of connector that is mated to the connector and to select a signal path from the connector to the processing resource along a first path or a second path. The signal path is selected based on the detected mated connector.

Other embodiments described herein provide for the connector to include at least one magnet to assist or enable the variety of different connectors to mate with the connector. The magnet or magnets can be positioned adjacent to the connector or be incorporated as part of the connector. In this way, the variety of different connectors (which also include a magnet or magnets that are positioned in similar locations) are each able to mate with the connector.

In another embodiment, the plurality of contacts includes a first set of contacts that are used for data transfer and a second set of contacts that are used for power transfer. The connector of the mobile computing device can be used to exchange both power and/or data depending on the type of connector that is mated with the connector. In some embodiments, the type of connector could include or be at least a part of a charger (such as a USB charger for a wall plug), a USB connector (or other data connector), or a stereo headset connector (that can include a microphone).

Embodiments described herein also provide a connector for the mobile computing device that is configured to enable the different types of connectors to mate with the connector in only one orientation. The connector can have a specific shape or structure so that the different types of connectors can only mate with the connector in the direction and orientation that matches the specific shape.

In other embodiments, the connector is configured to enable the different types of connectors to mate with the connector in two or more orientations. The mobile computing device can include a switch circuit that is configured to determine the orientation of the mated connector when the mated connector mates with the connector. Depending on the orientation of the mated connector, the switch circuit can switch a pair of input signal paths to route the input signal paths to the appropriate signal paths.

Some embodiments described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component, can exist on a hardware component independently of other modules/components or a module/component can be a shared element or process of other modules/components, programs or machines. A module or component may reside on one machine, such as on a client or on a server, or a module/component may be distributed amongst multiple machines, such as on multiple clients or server machines. Any system described may be implemented in whole or in part on a server, or as part of a network service. Alternatively, a system such as described herein may be implemented on a local computer or terminal, in whole or in part. In either case, implementation of system provided for in this application may require use of memory, processors and network resources, including data ports, and signal lines (optical, electrical etc.), unless stated otherwise.

Some embodiments described herein may generally require the use of computers, including processing and memory resources. For example, systems described herein may be implemented on a server or network service. Such servers may connect and be used by users over networks such as the Internet, or by a combination of networks, such as cellular networks and the Internet. Alternatively, one or more embodiments described herein may be implemented locally, in whole or in part, on computing machines such as desktops, cellular phones, personal digital assistances, laptop computers, or other computing devices. Thus, memory, processing and network resources may all be used in connection with the establishment, use or performance of any embodiment described herein (including with the performance of any method or with the implementation of any system).

Furthermore, some embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

Overview

FIG. 1 is a simplified block diagram of a mobile computing device that includes a connector and a data switching component under an embodiment. FIG. 1 illustrates a mobile computing device 100 that includes a connector 110 that is configured to mate with different types of other connectors, and also includes a data switching component 120 to detect the type of connector that is mated with the connector 110. As described herein, the data switching component 120 can automatically select a signal path depending on the detected mated connector.

As examples, the mobile computing device 100 may correspond to any device that includes roaming wireless network and/or telephony capabilities, including cellular telephony devices and/or mobile messengers. In particular, embodiments described herein may apply to numerous kinds of mobile or small form-factor computing devices. One type of mobile computing device that may be configured to include embodiments described herein includes a computer telephony device, such as a cellular phone or mobile device with voice-telephony applications (sometimes called "smart phone"). A computing device such as described may be small enough to fit in one hand, while providing cellular telephony features in combination with other applications, such as messaging, web browsing, media playback, personal information management (e.g. such as contact records management, calendar applications, tasks lists), image or video/media capture and other functionality. Mobile computing devices in particular may have numerous types of input mechanisms and user-interface features, such as keyboards or keypads, mufti-directional or navigation buttons, application or action buttons, and contact or touch-sensitive display screens. Some devices may include combinations of keyboard, button panel area, and display screen on one façade. The button panel region may occupy a band between the keypad and the display area, and include a navigation button and multiple application buttons or action buttons.

Specific types of messaging that may be performed include messaging for email applications, Short Message Service (SMS) messages, Multimedia Message Service (MMS) messages, and proprietary voice exchange applications (such as SKYPE). Still further, other types of computing devices contemplated with embodiments described herein include laptop or notebook computers, ultra-mobile computers, personal digital assistants, and other multi-functional computing devices or mobile/portable devices.

Still further, one or more embodiments may be implemented through any type of computing device such as a desktop computer that is configured to include real-time voice data exchange (e.g. through use of Internet Protocol telephony). Still further, other types of computer telephony devices exist, including standalone devices that connect directly to a telephone network (whether Internet Protocol or Public Switch Telephony System (PSTN)) and provide software interfaces and applications.

The mobile computing device 100 includes a connector 110 that can mate with various types of different connectors. Depending on the mated connector, the user may perform or access different functionalities on the mobile computing device 100. When a mated connector is mated with the connector 110, a data switching component 120 is configured to automatically detect the type of connector that is mated with the connector 110 and select a signal path for transferring and/or exchanging signals between the connector 110 and a processing resource 130. In some embodiments, the connector 110 can be used to exchange data and/or power depending on the type of connector that is mated with the connector 110. Having a connector that can provide interchangeable functionality depending on a mated connector can be particularly useful in small form factor devices.

When the data switching component 120 detects a particular connector or connector type that is mated with the connector 110, it selects a signal path that connects to a particular portion of the processing resource 130. For example, if a stereo headset connector is mated with the connector 110, the data switching component 120 can automatically select the audio paths in routing the signals from the connector 110 to an audio portion of the processing resource 130. On the other hand, if a USB connector is mated with the connector 110, the data switching component 120 can automatically select the data paths in routing the signals from the connector 110 to the data portion of the processing resource 130. In one embodiment, the data switching component 120 is configured to detect the type of connector that is mated to the connector 110 by detecting a voltage level of one or more contacts when the mated connector is mated with the connector 110.

In one embodiment, the mobile computing device 100 also includes a battery 140 that can receive charge from a power source. When a connector that can provide power is mated with the connector 110, power can be transferred via the connector 110 to recharge the battery 140. The mobile computing device can also include other components and circuitry such as a display, a keyboard, network and radio resources, and memory, but are not illustrated in FIG. 1 for simplicity.

The connector 110 of the mobile computing device 100 includes a plurality of contacts or pins. These contacts or pins are exposed on the connector 110 to enable a variety of other connectors to mate with (or connect to) the connector 110. When properly mated, the contacts of the connector 110 will line up and touch the corresponding contacts of each of the variety of different connectors. This enables signals to travel from one connector to another via each mated contact or pin. In one embodiment, the connector 110 is coupled to or is integrated with the housing of the mobile computing device 100 so that the connector is easily accessible to a user. In another embodiment, the housing of the mobile computing device 100 may also include a cover (or flap) that can cover the connector 110 when the connector 110 is not in use (e.g., not mated with another corresponding connector).

In one embodiment, the surface of the connector 110 (e.g., the surface in which the contacts are exposed) is designed to be flat so that the plurality of contacts or pins is flush with the remaining portion of the connector 110. To assist or enable the variety of different connectors to be able to mate with the connector 110, the connector 110 can also include at least one magnet. The magnet or magnets can be integrated to be at least a part of the connector 110 or be positioned adjacent to or close to the connector 110. Each of the variety of different connectors that can mate with the connector 110 also includes at least one magnet so that the two magnets attract one another when brought into close proximity or in contact with each other. In this manner, the magnet or magnets that are integrated with or positioned close to the connector 110 can assist or enable each of the other connectors to mate with the connector 110.

In other embodiments, the plurality of contacts or pins on the connector 110 can partially extend outward from the surface of the connector 110 or partially extend inward. Under this embodiment, the variety of different corresponding connectors that can mate with the connector 110 can be shaped to fit the connector 110 so that the contacts of the connector 110 will line up and come into contact with the corresponding contacts of each of the variety of different corresponding connectors. For example, if the plurality of contacts or pins on the connector 110 partially extends outward from the surface of the connector 110, the corresponding contacts or pins on the different corresponding connectors will extend inward. In other embodiments, at least one of the contacts on the connector 110 can be magnetic.

In some embodiments, the connector 110 can be used to charge the mobile computing device 100. A USB or micro-USB connector, for example, can be used to charge the mobile computing device 100 by connecting the mobile computing device 100 to a computer, laptop, or other electronic device that can provide power through the USB or micro-USB connector. When a USB or micro-USB connector is mated with the connector 110 and the other end of the USB connector cable is coupled to a personal computer, for example, the connector 110 can be used to exchange data signals with the personal computer and also receive power to charge the mobile computing device 100. In another example, a USB or micro-USB connector can be used as a wall charger (e.g., the USB or micro-USB charging connector is attached to one end of a cable and the other end of the cable could be attached to an adapter that plugs into wall socket). In other embodiments, the connector 110 can also be used to connect to a 3.5 mm or 2.5 mm standard stereo headset connector. Each of these different connectors is configured or designed to mate with the connector 110.

As discussed above, in some embodiments, the connector 110 also includes one or more magnets. If the connector 110 includes a magnet or magnets, the variety of different connectors that can mate with the connector 110 will also include a magnet or magnets that are similarly aligned or positioned as the magnets of the connector 110. The magnet of the connector 110 will be attracted to the magnet of the corresponding connectors that can mate with the connector 110. In other embodiments, each of the variety of different connectors will have a plurality of contacts or pins that match the plurality of contacts or pins of the connector 110. For example, if the connector 110 has a plurality of contacts or pins that are positioned in a row (e.g., the pins are all aligned in one line), each of the variety of different connectors will also have a plurality of contacts or pins that are positioned in a row to mate with the connector 110. The magnet or magnets can assist or enable the plurality of contacts on each different connector to line up with the plurality of contacts of the connector 110 when each of the different connectors is properly mated with the connector 110.

In one embodiment, the mobile computing device 100 performs different functions (or different processes occur) depending on the type of connector that is mated with the connector 110. If a USB charging connector that is plugged in to a power source (e.g., plugged into a wall socket) is mated with the connector 110, the battery 140 of the mobile computing device 100 is recharged, but no data is exchanged. If a micro-USB connector that is coupled to a laptop or other portable device is mated with the connector 110, the mobile computing device 100 can perform data operations using the USB or micro-USB connector, and also receive power to recharge the battery 140 of the mobile computing device 100. Similarly, if stereo headset connector is mated with the connector 110, the mobile computing device 100 can output sound (and input sound data from a microphone) on a headphone or speakers (or whatever audio device is plugged in to the stereo headset connector).

In another embodiment, the connector 110 can be mechanically or physically keyed (e.g., a keyed connector allows a corresponding connector to mate in only one direction). The connector 110 can be keyed by being designed or shaped to enable each of the variety of different connectors to mate with the connector 110 in only one orientation. For example, the connector 110 can be keyed by designing the connector 110 to be asymmetric about one or two axes. The variety of different connectors that can mate with the connector 110 will all have similar corresponding shapes so that they can each mate with the keyed connector 110.

In some embodiments, the connector 110 is not mechanically or physically keyed, but instead allows each of the variety of different connectors to mate with the connector 110 in two or more orientations. A mobile computing device 100 that includes a connector 110 that is not keyed can also include a switch circuit that is configured to determine the orientation of the mated connector when the mated connector mates with the connector 110. In some embodiments, the switch circuit can be a part of or be included in the data switching component 120.

The mobile computing device 100 also includes a data switching component 120 that is connected to the connector 110 and the processing resource 130. The data switching component 120 is configured to detect the type of connector that is mated to the connector 110 and to select a signal path from the connector 110 to the processing resource 130 along either a first data path or a second data path. The signal path is selected based on the detected mated connector. In one embodiment, the data switching component 120 is configured to detect the type of connector that is mated to the connector by detecting the voltage level of one or more contacts when the mated connector mates with the connector. In one embodiment, the data switching component 120 can be a part of or be included in the processing resource 130.

As discussed previously, different data connectors can be configured to mate with the connector 110. For example, in one embodiment, the connector 110 can mate with a USB or micro-USB connector. When the USB or micro-USB connector is mated with the connector 110, the data switching component 120 can detect that the mated connector is a USB or micro-USB connector. Upon detecting this connector type, the data switching component 120 can select a data path from the connector 110 to the processing resource 130. This selected data path enables data to be exchanged between the USB or micro-USB connector and the processing resource 130 of the mobile computing device 100. After the data path is selected, the processing resource 130 can detect whether the USB or micro-USB connector is connected to another device (such as a personal computer, laptop, or portable device), or to a wall charger.

If the USB or micro-USB connector is connected to a personal computer, for example, data can be exchanged between the mobile computing device 100 and the personal computer via the connection between the USB or micro-USB connector and the connector 110. Power can also be transmitted from the personal computer via the connection between the USB or micro-USB connector and the connector 110 to charge the battery 140 of the mobile computing device 100. On the other hand, if the USB connector is connected to a wall charger, no data is exchanged. Instead, the processing resource 130 routes the power signal to the battery 140 to charge it.

Similarly, when a stereo headset connector is mated to the connector 110, the data switching component 120 can detect that the mated connector is a stereo headset connector. Upon detecting this connector type, the data switching component 120 selects another data path from the connector 110 to the processing resource 130. This data path enables audio data (including data from a microphone) to be exchanged between the stereo headset connector and the processing resource 130. In other embodiments, other types of connectors can be configured to mate with the connector 110. The data switching component 120 can select other data paths from the connector 110 to the processing resource 130 depending on the other types of connectors that are detected. A more detailed description of the data switching component is described with reference to FIG. 6.

Connector

Figure 2:
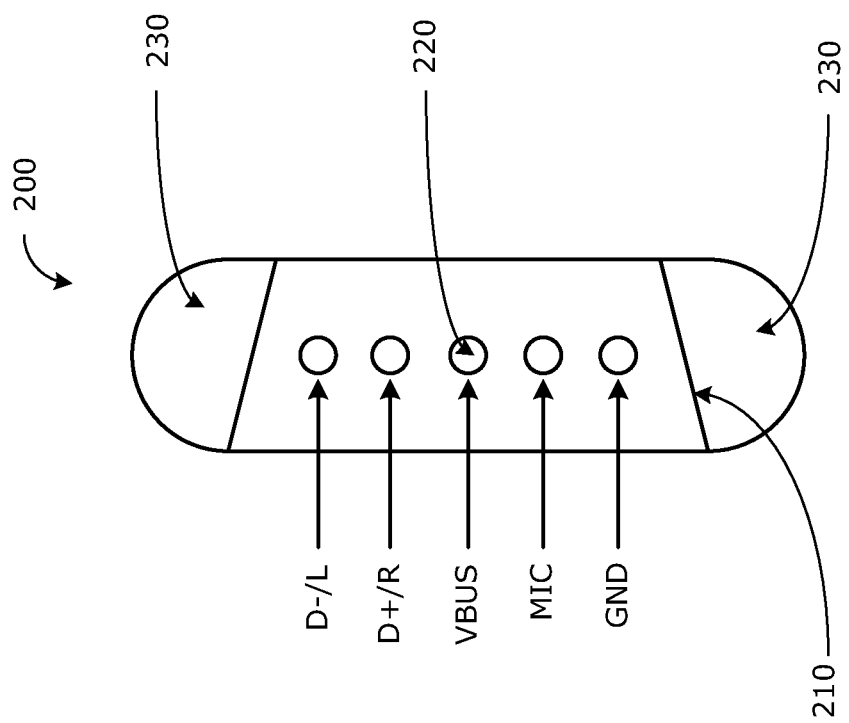
FIG. 2 is an illustrative representation of a connector, according to an embodiment.

FIG. 2 is an illustrative representation of a connector, according to an embodiment. The connector 200 can be at least partially integrated into the housing of a mobile computing device so that it is exposed on the surface of the mobile computing device. In various embodiments, the connector 200 can be positioned on a side of the mobile computing device, the top, the back, the front, or the bottom. In another embodiment, the connector 200 can be covered by a cover or a flap of the housing (or external skin or layer) of the mobile computing device.

The connector 200 comprises a body 210 and a plurality of contacts or pins 220. The connector 200 also includes a pair of magnets 230. The magnets 230 are positioned adjacent to or close to the body 210 to assist or enable each of the variety of connectors to mate with the connector 200. Each of the variety of connectors can also have similarly shaped and positioned magnets so that the magnets on the connector 200 attract the magnets on each of the variety of connectors when they are properly mated. When each of the variety of connectors is properly mated with the connector 200, the plurality of contacts of each of the variety of connectors will be aligned with the plurality of contacts of the connector 200. As discussed, when the plurality of contacts of each of the variety of connectors are aligned with the plurality of contacts of the connector 200, the contacts of the connector 200 will line up and come into contact with the corresponding contacts of each of the variety of different corresponding connectors. Signals can then be transferred and/or exchanged across the mated connectors.

In one embodiment, the connector 200 is physically or mechanically keyed such that each of a variety of different connectors can mate with the connector 200 in only one orientation. For example, if a connector is not keyed, such as the body of the connector being a rectangular shape, a mating connector with a similar size rectangular shape would be able to mate with the connector in two orientations. Thus, by shaping the body 210 in a specific shape or figure, the connector 200 can be keyed to only allow the variety of connectors to mate with the connector 200 in one orientation. In one embodiment, the body 210 is shaped or designed so that two sides of the body 210 are different in length or size (e.g., a trapezoid shape). The variety of connectors are also configured or shaped in this manner so that they can mate with the connector 200 in only one orientation. Other embodiments include a variety of different shapes (e.g., ridges on a side, different angled corners, etc.) to allow for a single orientation connection between a mating connector and the connector 200.

The connector 200 can include a different number of contacts or pins. In one embodiment, the connector 200 includes five contacts or pins 220 that are positioned in a line. In other embodiments, the contacts 220 can be arranged in a different way (e.g., in a circular fashion, in multiple rows, asymmetrically, etc.). The connector 200 has five contacts 220. The five contacts 200 correspond to two data pins (D−/L and D+/R), a voltage pin (VBUS), a microphone data pin (MIC), and a ground pin (GND). The connector 200 can be used for both data transfer and power transfer.

In one embodiment, when a USB connector that is connected to a personal computer is mated with the connector 200, data can be exchanged between the mobile computing device and the personal computer. The two data pins (D−/L and D+/R) can be used to exchange data via the connection between the connector 200 and the USB connector. Power can also be transferred from the personal computer to the mobile computing device to charge the mobile computing device via the VBUS and GND pins (e.g., charge up to 0.5 A current according to the USB specification).

Similarly, when a USB connector that is connected to a wall charger is mated with the connector 200, the data switching circuit detects the USB connector and selects a signal path from the connector 200 to the processing resource along a first data path or a second data path. After selecting the data path to the processing resource, the processing resource detects that the D+ pin and the D− pin is shorted. By detecting that the D+ pin and the D− pin are shorted, the processing resource determines that the USB connector is coupled to a wall charger and enables the battery of the mobile computing device to be charged (e.g., charge the mobile computing device up to 1 A current).

When a stereo headset connector is mated with the connector 200, stereo data can be transferred and/or exchanged between the stereo headset connector (with an attached headphone and microphone, or a set of speakers) and the mobile computing device. The data switching component detects that a stereo headset connector is mated with the connector 200 and selects a data path for sound data. The two data pins (D−/L and D+/R) and the microphone data pin (MIC) can be used to transfer and/or exchange signals from the stereo headset connector to the mobile computing device.

In some embodiments, due to the flat surface of the connector 200, a user may nonetheless try to plug in or connect one of many different connectors in the connector 200 in an improper orientation. Improper pin assignment may result in damage to the mobile computing device and to other connectors (and connected devices). To prevent this, the plurality of contacts or pins can be specifically arranged or assigned to prevent damage to the mobile computing device and to other connectors even when the different connectors are brought into contact with the connector 200 in an improper orientation. For example, referring to the positions of the contacts in FIG. 2 and listing the contacts from the top to the bottom, the contacts can be assigned in this manner: the first pin corresponds to MIC, the second pin corresponds to D+/R, the third pin corresponds to GND, the fourth pin corresponds to D−/L and the fifth pin corresponds to VBUS. This pin arrangement, for example, can prevent damage to the connectors and the mobile computing device even if the user mistakenly attempts to mate the variety of connectors to the connector 200 in an improper orientation.

Figure 3:
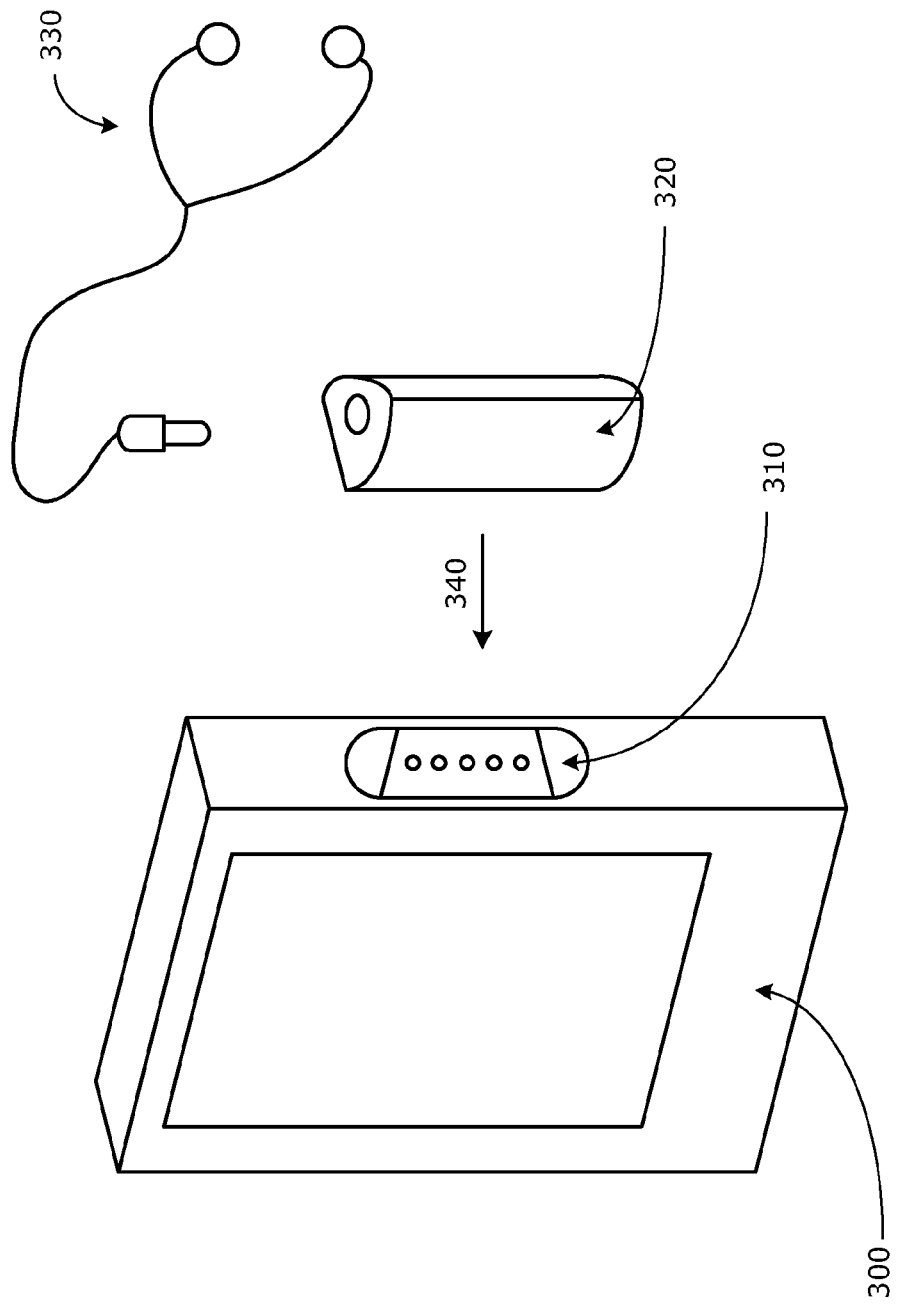
FIG. 3 is an illustrative representation of a mobile computing device with a stereo headset connector under an embodiment.

FIG. 3 is an illustrative representation of a mobile computing device with a stereo headset connector under an embodiment. The mobile computing device 300 includes a connector 310. The connector 310 is physically keyed (like the connector 200 in FIG. 2) to only allow the different connectors to mate with the connector 310 in only one orientation. Because the connector 310 is keyed, each of the variety of connectors are also similarly shaped or configured like the connector 310 so that it can mate with the connector 310.

The stereo headset connector 320 is one of the variety of connectors that can mate with the connector 310. Because the connector 310 is keyed, the stereo headset connector 320 can only be mated 340 (or connected) to the connector 310 in only one orientation. In one embodiment, the stereo headset connector 320 is designed or configured to mate 340 with the connector 310 so that the plug socket for the headphone 330 is at the top (e.g., when a user is holding the mobile computing device 300 in his or her hand upright, the plug socket is at the top). In another embodiment, the stereo headset connector 320 can be designed or configured to mate 340 with the connector 310 so that the plug socket for the headphone 330 is on the bottom.

Figure 4:
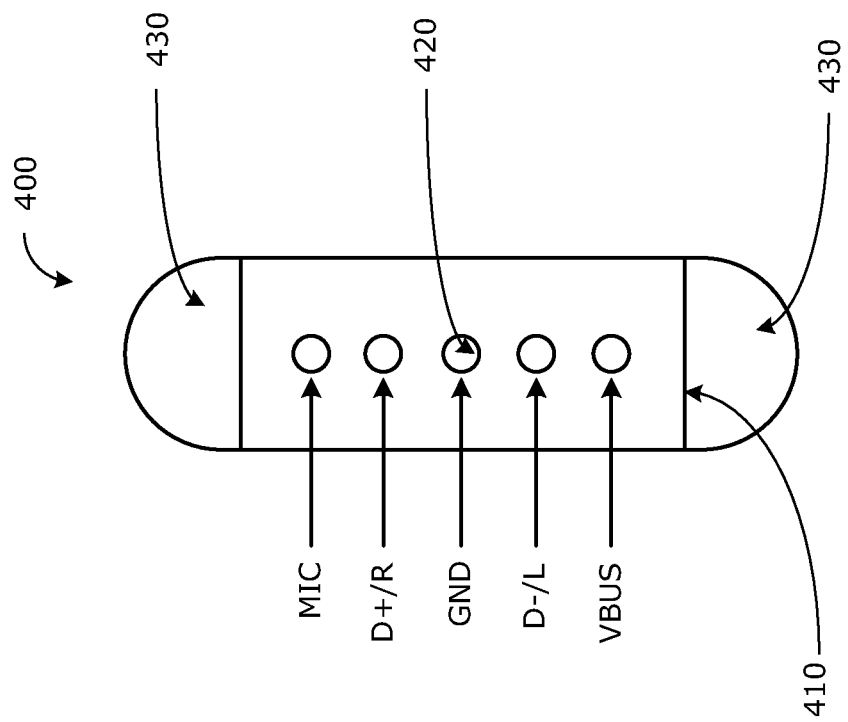
FIG. 4 is another illustrative representation of a connector, according to another embodiment.

FIG. 4 is another illustrative representation of a connector, according to another embodiment. The connector 400 is similar to the connector 200 of FIG. 2, but is not physically or mechanically keyed. The connector 400 comprises a body 410 and a plurality of contacts or pins 420. The connector 400 also includes a pair of magnets 430. The magnets 430 are positioned adjacent to or close to the body 410 to assist or enable each of the variety of connectors to mate with the connector 400. Each of the variety of connectors can also have similarly shaped and positioned magnets so that the magnets on the connector 400 attract the magnets on each of the variety of connectors when they are properly mated. When each of the variety of connectors is properly mated with the connector 400, the plurality of contacts of each of the variety of connectors will be aligned with the plurality of contacts of the connector 400. As discussed previously, when the plurality of contacts of each of the variety of connectors are properly aligned with the plurality of contacts of the connector 400, the contacts of the connector 410 will line up and come into contact with the corresponding contacts of each of the variety of different corresponding connectors. Signals can then be transferred and/or exchanged across the mated connectors.

The connector 400 includes a plurality of contacts or pins 420. In one embodiment, the connector 400 includes five contacts or pins 420 that are aligned or positioned in a line. In other embodiments, the contacts 420 can be arranged in a different manner (e.g., in a circular fashion, in multiple rows, asymmetrically, etc.). The connector 400 has five contacts 420. Like the connector 200 of FIG. 2, the five contacts 420 of the connector 400 correspond to two data pins (D−/L and D+/R), a voltage pin (VBUS), a microphone data pin (MIC), and a ground pin (GND). The connector 400 can be used for both data transfer and power transfer.

As discussed, the connector 400 is not physically or mechanically keyed so that each of the variety of connectors that can mate with the connector 400 in two or more orientations. For example, because the body 410 of the connector 400 is a rectangular shape that is symmetric about the x-direction and y-direction, each of the variety of connectors can mate with the connector 400 in two orientations. In one embodiment, to prevent damage to the connectors and the mobile computing device, the contacts or pins 420 are specifically assigned or selected so that the different orientations of the mated connector does not damage the connectors or the mobile computing device. For example, referring to the positions of the contacts in FIG. 4 and listing the contacts from the top to the bottom, the contacts can be assigned in this manner: the first pin corresponds to MIC, the second pin corresponds to D+/R, the third pin corresponds to GND, the fourth pin corresponds to D−/L and the fifth pin corresponds to VBUS. This pin arrangement enables the connector 400 to properly mate with each of the different connectors in two different orientations.

Because the connector 400 is not physically keyed and enables a mated connector to mate with the connector 400 in two or more orientations, the mobile computing device must properly route the signals from the connector 400 to the data switching component. A mobile computing device that has an un-keyed connector will also comprise a switch circuit to enable a user to plug in a corresponding connector to the un-keyed connector in two or more orientations.

Switch Circuit

Figure 5:
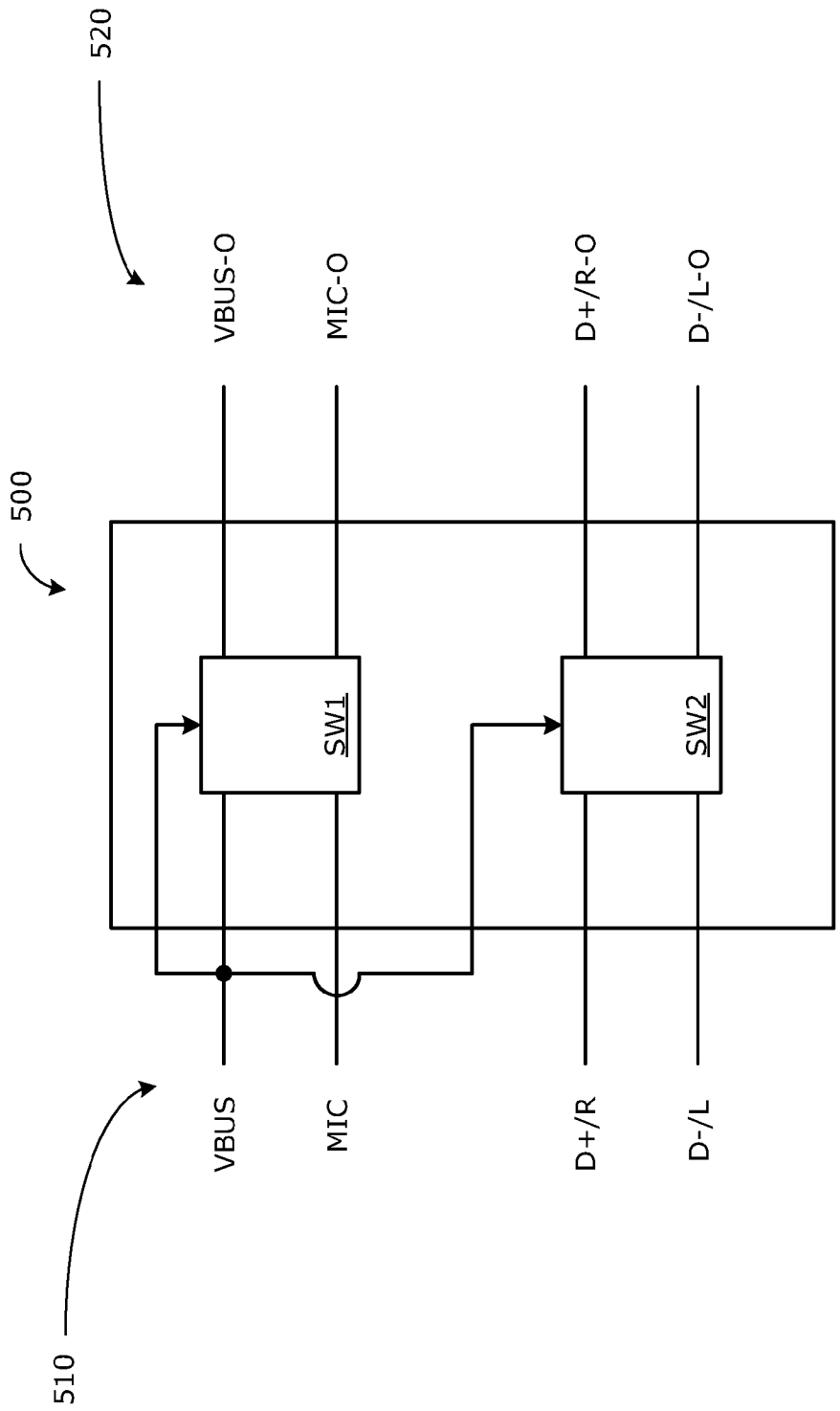
FIG. 5 illustrates a switching circuit under an embodiment.

FIG. 5 illustrates a switch circuit under an embodiment. In one embodiment, a mobile computing device can include a switch circuit 500. When the mobile computing device includes a connector that is not keyed, like connector 400 in FIG. 4, a user can connect each of a variety of different connectors to the un-keyed connector in two or more orientations. For example, referring back to FIG. 4, the connector 400 has five contacts or pins positioned in a line and are assigned in order: MIC, D+/R, GND, D−/L, and VBUS. In one embodiment, because the connector 400 is rectangular in shape, a corresponding mating connector is capable of mating with the connector 400 in two orientations. In one orientation, the contacts of the mating connector can be mated with the contacts of the connector 400 so that the pins line up in the same order: MIC, D+/R, GND, D−/L, and VBUS. In the second orientation, the contacts of the mating connector can be mated with the contacts of the connector 400 so that the pins line up in the reverse order: VBUS, D−/L, GND, D+/R, and MIC. In the second orientation, the VBUS contact of the mating connector will be mated with the MIC contact of the connector 400. Similarly, the two data pins will be switched.

In order to properly transmit and/or exchange the appropriate signals between a mating connector and the connector 400, the data signals at the connector 400 may have to be switched (e.g., the data being transferred or exchanged on the MIC pin of the mating connector should be routed to the proper signal line corresponding to the MIC pin of the connector 400, and the data being transferred or exchanged on the VBUS pin of the mating connector should be routed to the proper signal line corresponding to the VBUS pin of the connector 400, etc.). The switch circuit 500 can be used to properly transmit and/or exchange the appropriate signals. In one embodiment, the switch circuit 500 can be included in a mobile computing device that has a connector 400.

In one embodiment, the switch circuit 500 comprises a first switch SW1 and a second switch SW2. Referring to the connector 400 in FIG. 4, the five assigned contacts or pins for the mobile computing device with the un-keyed connector 400 includes MIC, D+/R, GND, D−/L, and VBUS. On the connector side 510 of the switch circuit 500, each connector signal line corresponds to each of the five contacts or pins. When a user mates or connects one of the variety of different connectors to the connector 400 in a first orientation (so that the corresponding contacts line up when the connectors are mated), the switch circuit 500 will enable the first switch SW1 and the second switch SW2 to route VBUS to VBUS-O, MIC to MIC-O, D+/R to D+/R-O, and D−/L to D−/L-O.

In one embodiment, the switch circuit 500 uses the signal on the VBUS pin to determine how to switch the two switches. The switch circuit 500 can switch the signals using the VBUS detection at a threshold (e.g., below VBUS and above MIC bias). For example, if VBUS is detected, the first switch SW1 and the second switch SW2 will be switched to enable the signals to directly pass through (e.g., route VBUS to VBUS-O, MIC to MIC-O, D+/R to D+/R-O, and D−/L to D−/L-O). If VBUS is not detected, the switch circuit 500 can determine that the second orientation is used so that the contacts of the mating connector are in reverse order relative to the contacts of the connector 400. In the case, the first switch SW1 and the second switch SW2 will be switched to switch the signals from the connector side 510 to the output side 520.

For example, if the mating connector is mated with the connector 400 in the second orientation, the VBUS pin of the mating connector will be in contact with the MIC pin of the connector 400. The D−/L pin of the mating connector will be in contact with the D+/R pin of the connector 400, while the D+/R pin of the mating connector will be in contact with the D−/L pin of the connector 400. Similarly, the MIC pin of the mating connector will be in contact with the VBUS pin of the connector 400. To maintain the correct connection even in the second mated orientation, the switch circuit 500 will determine that VBUS is not detected on the VBUS pin of the connector 400, and will cause the two switches to switch the signals from the connector side 510 to the output side 520. Data being transferred and/or exchanged on the VBUS pin of the connector 400 will be switched by the switch SW1 to route to the data to and from the MIC-O signal path, while data being transferred and/or exchanged on the MIC pin of the connector 400 will be switched by SW1 to route to the data to and from the VBUS-O signal path. Similarly, the data on the D+/R and D−/L pins of the connector 400 will be switched by the switch SW2.

In other embodiments, different methods for detecting the orientation of the mating connector can be used. Furthermore, the connectors can have a different number of pins (more or less than 5) and can also have a different number of switches. The number of switches can depend on the number of pins as well as the orientation of the contacts or pins on the connector of the mobile computing device. The switch circuit 500 can be a high speed, high current switch circuit to meet high speed USB signal bandwidth and timing specifications (e.g., the first switch SW1 and/or the second switch SW2 can be high speed switches). The first switch SW1 and/or the second switch SW2 can also be switches that are capable of handling a certain amount of current (such as 1 A of current) to meet USB electrical specifications. In another embodiment, the switch circuit 500 can be a part of the data switching component and/or a part of the processing resource of the mobile computing device.

Data Switching Component

Figure 6:
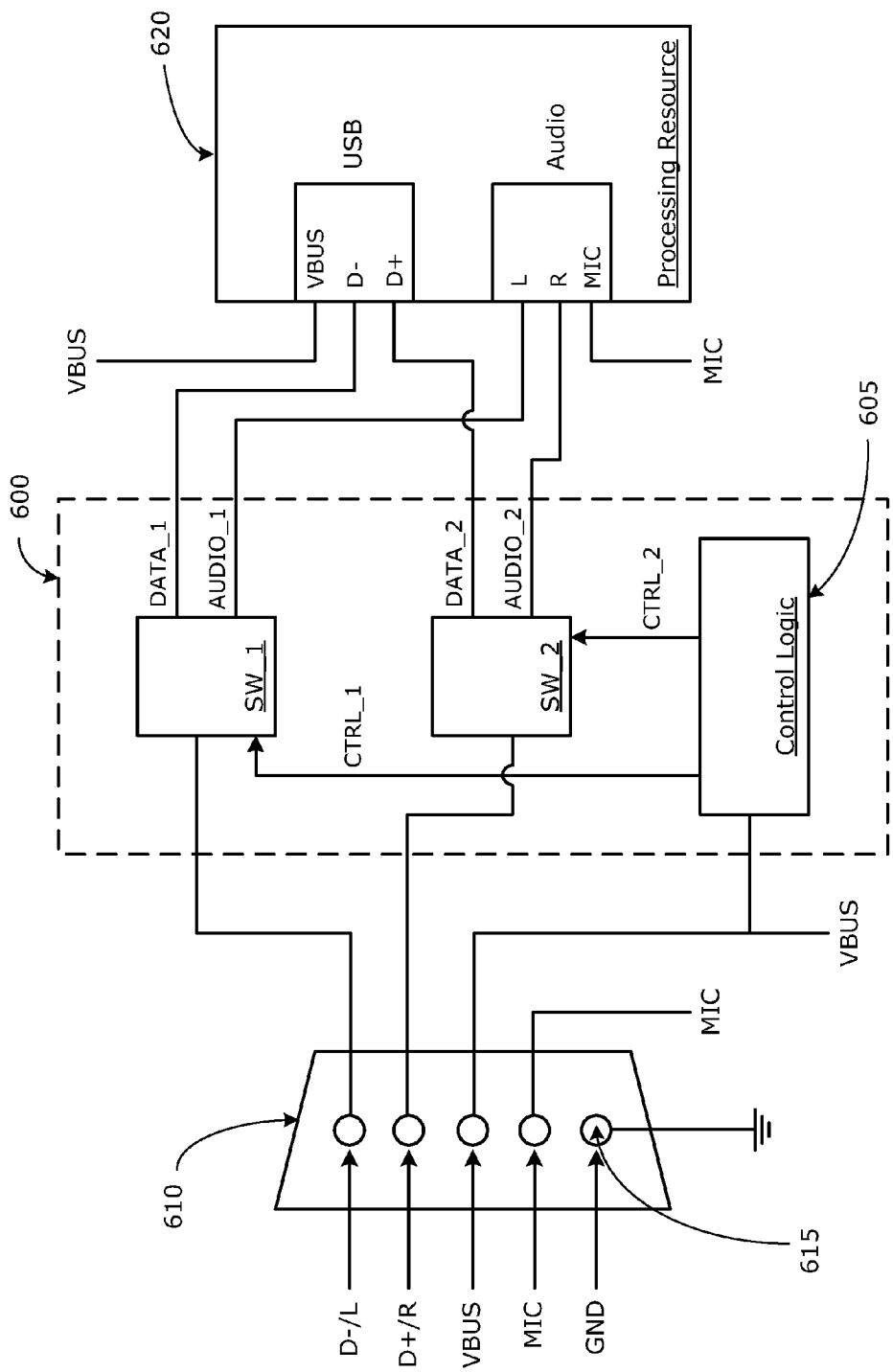
FIG. 6 is an illustrative representation of a data switching component, according to an embodiment.

FIG. 6 is an illustrative representation of a data switching component, according to an embodiment. As discussed above, a mobile computing device can include a data switching component 600 that is connected to the connector 610 and the processing resource 620. The data switching component 600 is configured to detect the type of connector that is mated to the connector 610. As discussed previously, in one embodiment, the data switching component 600 can detect the type of connector that is mated to the connector 610 by detecting a voltage level of at least one of the contacts 615 when the mated connector is mated with the connector 610.

Figure 7:
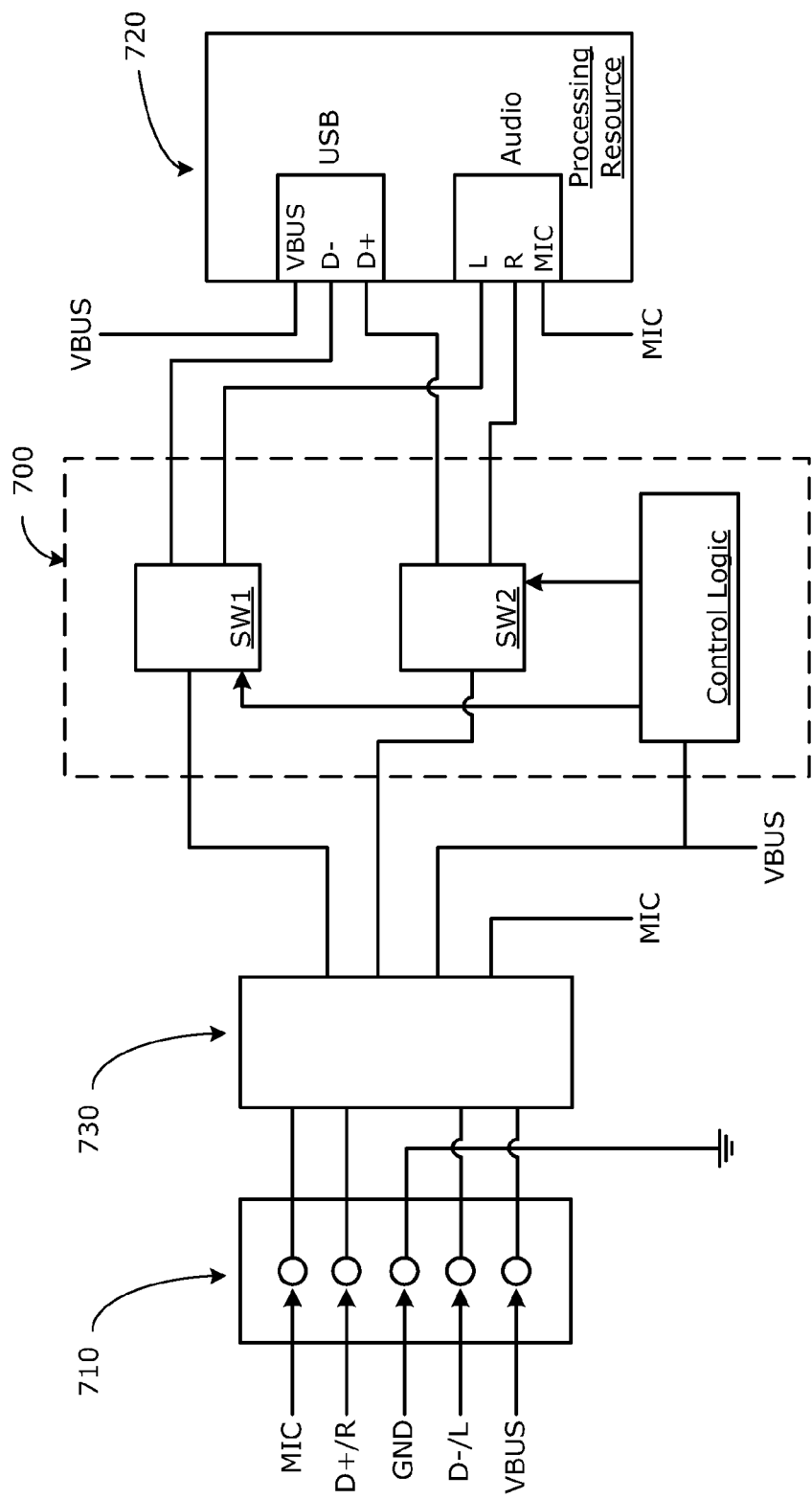
FIG. 7 is an illustrative representation of a data switching component, according to another embodiment.

The connector 610 can be a physically or mechanically keyed connector like the connector 200 in FIG. 2. Like the connector 200 in FIG. 2, the connector 610 can have a specific shape or design so that each of the variety of different connectors can mate with the connector 610 in only one orientation. When mated, the contacts or pins of the mated connector will align and be in contact with the contacts or pins of the connector 610. However, in one embodiment, the connector 610 can be an un-keyed connector. The mobile computing device with an un-keyed connector includes a switch circuit as described in FIG. 5. A mobile computing device comprising an un-keyed connector, a switch circuit and a data switching component under an embodiment is illustrated in FIG. 7 below.

The data switching component 600 includes a first switch SW_1 and a second switch SW_2, and a control logic 605. In one embodiment, the first switch SW_1 receives a signal path from the D−/L pin and a control signal CTRL_1 from the control logic 605. The first switch SW_1 is also connected to DATA_1 and AUDIO_1. DATA_1 is connected to the USB component of the processing resource 620, while AUDIO_1 is connected to the audio component of the processing resource 620. Similarly, the second switch SW_2 receives a signal path from the D+/R pin and a control signal CTRL_2 from the control logic 605. The second switch SW_2 is also connected to DATA_2 and AUDIO_2. DATA_2 is connected to the USB component of the processing resource 620, while AUDIO_2 is connected to the audio component of the processing resource 620. The USB component also receives a VBUS signal corresponding to the VBUS contact or pin on the connector 610 and the audio component receives a MIC signal corresponding to the MIC contact or pin on the connector 610.

As discussed previously, different types of connectors can be configured to mate with the connector 610. For example, in one embodiment, the connector 610 can mate with a USB or micro-USB connector. The connector 610 can also mate with a stereo headset connector. Depending on the mated connector, the data switching component 600 will route the data signals transferred and/or exchanged between the connector 610 and the processing resource 620. In one embodiment, the data switching component 600 can detect the type of connector that is mated with the connector 610 by detecting a voltage level of a signal on at least one of the contacts or pins 615. For example, the data switching component 600 detects the type of connector that is mated with the connector 610 by detecting the voltage of the signal corresponding to the VBUS pin.

Because the connector 610 is keyed, the contacts of the mated connector will align properly with the contacts 615 of the connector 610. The control logic 605 is configured to receive a signal from the VBUS contact or pin of the connector 610 and to detect the presence of VBUS. In one embodiment, depending on the voltage carried on VBUS, the control logic 605 can control detect whether a USB or micro-USB connector has been mated with the connector 610 or whether a stereo headset connector has been mated with the connector 610.

Upon detecting that a USB or micro-USB connector has been mated with the connector 610, the control logic 605 of the data switching component 600 sends a first control signal CTRL_1 to the first switch SW_1 to cause the first switch SW_1 to select the data path DATA_1. The signal from D−/L can be routed from the connector 610 to the D− pin of the USB component of the processing resource 620. Similarly, the control logic 605 also sends a second control signal CTRL_2 to the second switch SW_2 to cause the second switch SW_2 to select the data path DATA_2. The signal from D+/R can be routed from the connector 610 to the D+ pin of the USB component of the processing resource 620. This way, if the USB or micro-USB connector is connected to a personal computer or laptop, data can be exchanged between the personal computer or laptop and the processing resource 620 of the mobile computing device.

In some embodiments, when the USB or micro-USB connector is mated with the connector 610, the processing resource 620 can also detect whether the D+ pin and the D− pin are shorted. By detecting that the D+ pin and the D− pin are shorted, the processing resource 620 determines that the USB connector is coupled to a wall charger and enables the battery of the mobile computing device to be charged (e.g., charge the mobile computing device up to 1 A current). If the D+ pin and the D− pin are not shorted, the processing resource 620 determines that the USB connector is coupled to another device, such as a personal computer or laptop, and enables data and power to be exchanged.

Similarly, if a stereo headset connector is mated with the connector 610, the data switching component 600 detects that the mated connector is a stereo headset connector and not a USB connector. Upon detecting that a stereo headset connector has been mated with the connector 610, the control logic 605 of the data switching component 600 sends a first control signal CTRL_1 to the first switch SW_1 to cause the first switch SW_1 to select the data path AUDIO_1. The signal from D−/L can be routed from the connector 610 to the L pin of the audio component of the processing resource 620. Similarly, the control logic 605 also sends a second control signal CTRL_2 to the second switch SW_2 to cause the second switch SW_2 to select the data path AUDIO_2. The signal from D+/R can be routed from the connector 610 to the R pin of the audio component of the processing resource 620. This way, the processing resource 620 can enable sound data to be exchanged between a headset that is plugged into the stereo headset connector (e.g., L and R correspond to left and right audio). The MIC data can also be exchanged between the connector 610 and the processing resource 620.

In some embodiments, the audio path (AUDIO_1 and AUDIO_2 signal paths) can be the default path so that the two switches only switch to the data path (DATA_1 and DATA_2) when a USB or micro-USB connector is mated with the connector 610. In other embodiments, the data path can be the default path. In one embodiment, the data switching component 600 can be a part of or be included in the processing resource 620.

FIG. 7 is an illustrative representation of a data switching component, according to another embodiment. As discussed above, a mobile computing device can include a data switching component 700 that is connected to the connector 710 and the processing resource 720. The data switching component 700 is configured to detect the type of connector that is mated to the connector 710. As discussed previously, in one embodiment, the data switching component 700 can detect the type of connector that is mated to the connector 710 by detecting a voltage level of at least one of the contacts 715 when the mated connector is mated with the connector 710.

The data switching component 700 is similar to the data switching component 600 in FIG. 6. The difference between FIG. 6 and FIG. 7 is that in FIG. 7, the connector 710 is an un-keyed connector. Because the connector 710 is an un-keyed connector, a mating connector can mate with the connector 710 in two or more orientations. As discuss above, one orientation would align the pins of the mating connector properly with the pins of the connector 710, while the other operation would reverse the pin alignment between the connectors. Due to the multiple orientations, a switch circuit 730 can be included between the connector 710 and the data switching component 700.

The data switching component 700 will perform the same function as the data switching component 600 of FIG. 6. Depending on the mated connector, the data switching component 700 will route the data signals transferred and/or exchanged between the connector 710 and the processing resource 720.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A mobile computing device comprising:
 a housing;
 a connector provided on the housing, wherein the connector includes a body with an exterior surface, a plurality of contacts that are provided on the exterior surface, and a magnetic component positioned adjacent to the body;
 a processing resource comprising a data component and an audio component; and
 a data switching component comprising:
  a first switch having a first input coupled to a first contact of the plurality of contacts, a first output coupled to the data component, and a second output coupled to the audio component;
  a second switch having a second input coupled to a second contact of the plurality of contacts, a third output coupled to the data component, and a fourth output coupled to the audio component;
  a control logic to detect a voltage signal provided on a third contact of the plurality of contacts when a corresponding connector is mated to the connector, and based on the detected signal, control the first switch and the second switch to route a signal provided on the first contact and a signal provided on the second contact to either the data component or the audio component;

wherein when the control logic routes the signal provided on the first contact and the signal provided on the second contact to the data component, the processing resource determines whether the first output coupled to the data component and the third output coupled to the data component are shorted.

2. The mobile computing device of claim 1, wherein the plurality of contacts includes a set of contacts for power transfer, the set of contacts including the third contact.

3. The mobile computing device of claim 2, wherein the mobile computing device is enabled to exchange both power and data concurrently via the connector.

4. The mobile computing device of claim 1, wherein the corresponding connector is coupled to or is at least a part of: (i) a charger, (ii) a USB connector, or (iii) an audio headset connector.

5. The mobile computing device of claim 1, wherein the control logic controls the first switch and the second switch by providing a first control signal to the first switch and a second control signal to the second switch based on the detected signal.

6. The mobile computing device of claim 1, wherein the body of the connector is shaped to have sides of different lengths to enable the corresponding connector to mate with the connector in only one orientation.

7. The mobile computing device of claim 1, wherein in response to determining that the first output coupled to the data component and the third output coupled to the data component are shorted, the processing resource determines that the corresponding connector is coupled to a charger and only power is to be received via the connector.

8. A mobile computing device comprising:
a housing;
a connector provided on the housing, wherein the connector includes a body with an exterior surface, and a plurality of contacts that are provided on the exterior surface, the connector being structured to enable the corresponding connector to mate with the connector in only one orientation;
a processing resource comprising a data component and an audio component; and
a data switching component comprising:
a first switch having a first input coupled to a first contact of the plurality of contacts, a first output coupled to the data component, and a second output coupled to the audio component;
a second switch having a second input coupled to a second contact of the plurality of contacts, a third output coupled to the data component, and a fourth output coupled to the audio component;
a control logic to detect a voltage signal provided on a third contact of the plurality of contacts when a corresponding connector is mated to the connector, and based on the detected signal, control the first switch and the second switch to route a signal provided on the first contact and a signal provided on the second contact to either the data component or the audio component;
wherein when the control logic routes the signal provided on the first contact and the signal provided on the second contact to the data component, the processing resource determines whether the first output coupled to the data component and the third output coupled to the data component are shorted.

9. The mobile computing device of claim 8, wherein the connector is configured to enable the corresponding connector to mate with the connector in only one orientation by structuring the exterior surface of the body of the connector to have a shape so that the corresponding connector fits the shape in only one orientation.

10. The mobile computing device of claim 8, wherein the plurality of contacts includes a set of contacts for power transfer, the set of contacts including the third contact.

11. The mobile computing device of claim 10, wherein the plurality of contacts includes a contact for transferring microphone data.

12. The mobile computing device of claim 10, wherein the mobile computing device is enabled to exchange both power and data concurrently via the connector.

13. The mobile computing device of claim 8, wherein the corresponding connector is coupled to or is at least a part of: (i) a charger, (ii) a USB connector, or (iii) an audio headset connector.

14. The mobile computing device of claim 8, wherein the control logic controls the first switch and the second switch by providing a first control signal to the first switch and a second control signal to the second switch based on the detected signal.

15. The mobile computing device of claim 8, wherein in response to determining that the first output coupled to the data component and the third output coupled to the data component are shorted, the processing resource determines that the corresponding connector is coupled to a charger and only power is to be received via the connector.

* * * * *